May 28, 1968  K. A. J. HEAD  3,385,146
BOX TOOLS

Filed Dec. 12, 1966  3 Sheets-Sheet 1

INVENTOR
KENNETH AUBREY JOSEPH HEAD
BY
*Young & Thompson*
ATTORNEYS

May 28, 1968  K. A. J. HEAD  3,385,146
BOX TOOLS

Filed Dec. 12, 1966  3 Sheets-Sheet 3

INVENTOR
KENNETH AUBREY JOSEPH HEAD
BY
Young + Thompson
ATTORNEYS

United States Patent Office 3,385,146
Patented May 28, 1968

3,385,146
BOX TOOLS
Kenneth Aubrey Joseph Head, 2 Edmund St.,
Swindon, England
Filed Dec. 12, 1966, Ser. No. 601,089
4 Claims. (Cl. 82—35)

ABSTRACT OF THE DISCLOSURE

A roller box tool for a turret lathe has a body formed in two parts, namely a mounting part for fixing to the machine turret, and a roller carrier part on which are mounted adjustable rollers and a turning tool holder; the two parts have locating surfaces which interengage to provide accurate relative location and the mounting part comprises a mounting section for attachment to the turret face and a location section which locates relatively to the roller carrier and is in the form of a plate bolted to the mounting section with a degree of float laterally of the turning axis when the bolts are slackened and with tool fitted.

Figure 1:
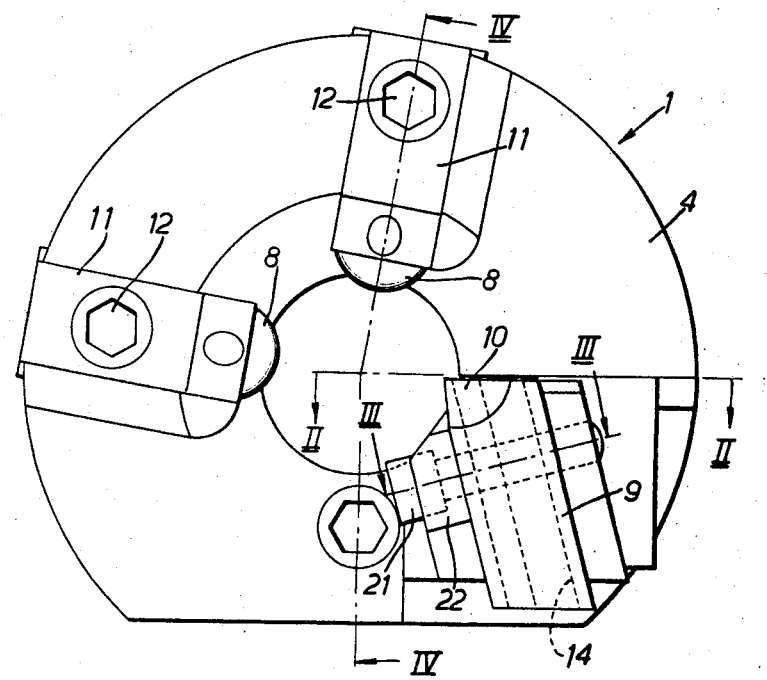

This invention relates to box tools of the roller type for use with turret lathes. Such box tools, which are sometimes referred to as "steady turning tools," have a body for bolting to the turret face and on which are adjustably mounted a tool holder and two steady rollers. In use the turning tool is set slightly in front of the rollers so that when the bar diameter is reduced the rollers immediately support the work and ensure adequate support as turning proceeds.

With roller box tools at present in use at least final setting up has to be accomplished on the lathe itself as the tool and rollers not only have to be set accurately with respect to each other but also with respect to the lathe turning axis. Thus setting up to replace a chipped or worn tool during a machining run, which may occur at frequent intervals when a hard material is being machined, often results in a low utilisation factor for the lathe and represents a material proportion of machining costs. The object of the invention is to provide a roller box tool which can be accurately set up off the machine and simply fitted to replace a chipped tool with the minimum stopped time of the machine.

To this end a roller box tool according to the invention has a body formed in two parts, namely a mounting part for fixing to the machine turret, and a roller carrier part on which are mounted adjustable rollers and a turning tool holder; the two parts have locating surfaces which interengage to provide accurate relative location and the mounting part comprises a mounting section for attachment to the turret face and a location section which is adjustably bolted to the mounting section for adjustment laterally thereof and locates relatively to the roller carrier. Thus during the initial setting up the location section is accurately adjusted relatively to the mounting section to provide correct alignment of the box relatively to the lathe turning axis.

Reference to "lateral" adjustment herein refers to adjustment laterially of the lathe turning action when the box tool is fitted on the lathe.

The turning tool can be replaced by simply detaching the carrier part from the mounting part and fitting a replacement which has been accurately set up off the machine, after which machining can immediately recommence. No setting upon the machine is necessary after the initial setting of the mounting part on the turret face which can if desired be retained for a succession of different machine runs.

The location section is conveniently in the form of a plate bolted to the mounting section with a sufficient degree of float laterally of the turning axis, sufficient to provide the desired lateral adjustment, when the bolts are slackened. The plate preferably has a central bore which can be accurately set using a fitting setting piece mounted in the machine collet or chuck.

Figures 2, 3:
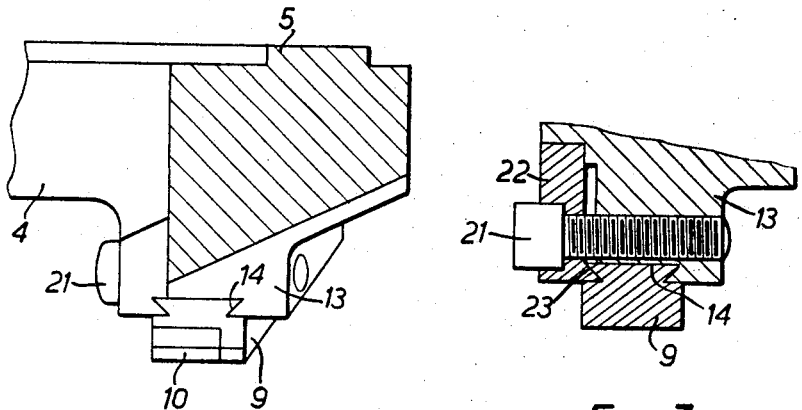
Figure 4:
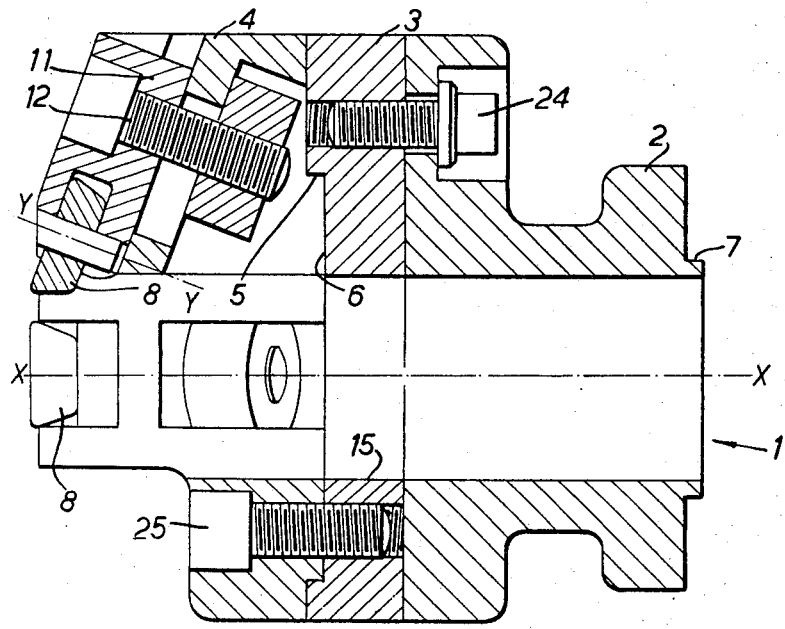
Figure 5:
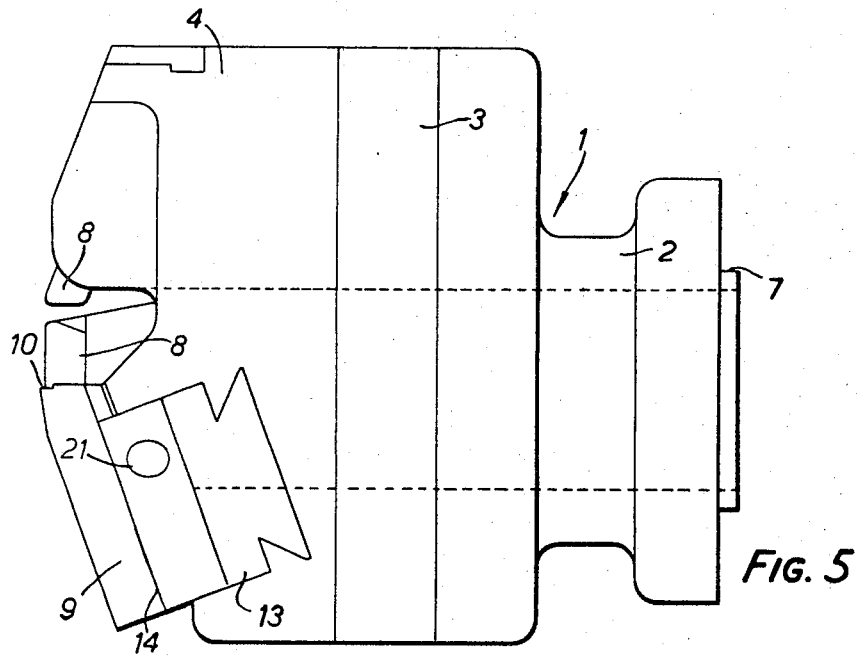
Figure 6:
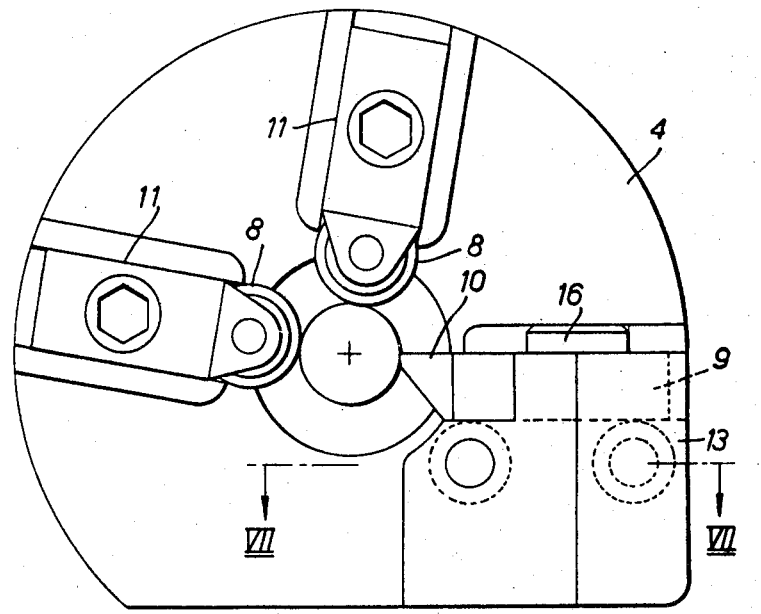
Figure 7:
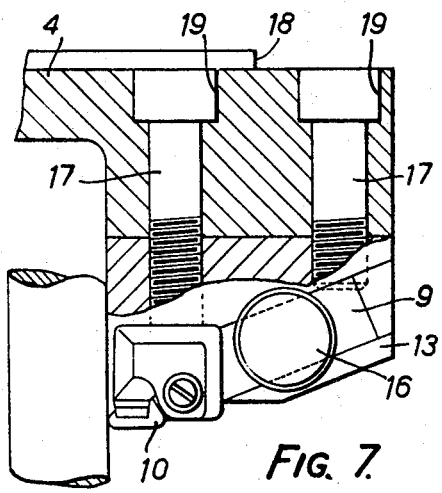

Roller box tools representing two embodiments of the invention will now be described by way of example with reference to the accompanying drawings in which:

FIGURE 1 is an elevation of the first embodiment looking along the turning axis of the lathe from the headstock end, FIGURE 2 is a sectional view on the line II—II of FIGURE 1, FIGURE 3 is a scrap section view on the line III—III of FIGURE 1, FIGURE 4 is a section on the line IV—IV of FIGURE 1, FIGURE 5 is a side view of the first embodiment, FIGURE 6 is an elevation of the second embodiment looking along the turning axis of the lathe from the headstock end, and FIGURE 7 is a scrap view, partly in section, on the line VII—VII of FIGURE 6.

Referring to FIGURES 1 to 5, the box has a hollow body 1 formed by three machined castings; namely a mounting section 2 for bolting to a turret face (not shown) of the machine with which the box is to be used, a location section in the form of a plate 3 attached by bolts such as 24 to the mounting section 2 and laterally adjustable in position thereon, and a roller carrier 4 attached by bolts such as 25 to the location plate. The roller carrier 4 has a locating spigot 5 which engages a recess 6 in the location plate 3 to provide accurate relative location of these two parts.

The mounting section 2 has the usual spigot location 7 for the turret face and the roller carrier 4 has two steady roller 8 and a tool holder 13 for a turning tool 9 with a brazed-on tip 10. The rollers 8 are mounted on slides 11 each provided with locking screw adjustment 12 so that they can be adjusted radially to suit the diameter to be turned and the tool holder 13 is formed as a dovetail slide. The body of the tool 9 has a dovetail form at 14, so that the tool in effect forms a cross slide which is mounted in the slide 13 and enables the tool 9 to be adjusted tangentially of the work. A bolt 21 is provided for clamping the tool in the adjusted position by means of a clamping plate 22 with a tapering lip 23 which engages one side of the dovetail in the tool body. The tangential adjustment of the tool 9 is the more usual form but an alternative radial tool arrangement can equally well be employed if desired.

The only setting upon the machine required is correct alignment of the mounting part, comprising the mounting section 2 and location plate 3, relative to the lathe turning axis X—X. To achieve this the mounting part is bolted to the appropriate turret face with the location plate 3 loosely bolted to the mounting section 2. The plate 3 has a setting bore 15 which is coaxial with the locating recess 6 in the plate, and a setting piece (not shown) with a diameter which is a snug fit in the bore 15 is fitted in the machine collet or chuck. With the setting piece located in the bore 15 the location plate 3 is locked to the mounting section 2 and the locating recess is then true with the lathe turning axis X—X. No further setting upon the machine is required during a production run, and the same setting can be retained for subsequent runs of different machining diameters if desired.

The roller carrier 4 is separately set up off the machine on a bench setting fixture, the rollers 8 and the tool 9 mounted in the tool holder slide 13 being adjusted to the diameter to which it is required to turn. The bench fixture has a locating recess which fits the locating spigot 5 on the roller carrier 4 and is coaxial with respect to a rotary chuck, taper socket or other means for holding a setting piece of the diameter to be mounted and which projects through the roller carrier 4. The rollers 8 and tool 9 are accurately set to this setting piece, after which the roller carrier 4 merely requires bolting to the location plate 3 which has already been adjusted in position on the lathe. Accurate alignment with respect to the turning axis X—X is ensured by engagement of the locating spigot 5 within the recess 6 in the location plate 3. The box is now ready for use.

The second embodiment illustrated in FIGURES 6 and 7 has a body formed in two parts and utilises two rollers 8 mounted on slides 11 as before. However, in this case the tool holder 13 is not formed as a slide and is rigidly fixed to the roller carrier 4. The tool 9 has a "throw-away" type tip 10 and is releasably held in the tool holder 13 by a clamp member 16.

The tool holder 13 is fixed to the roller carrier 4 by two bolts 17 received in respective bores drilled from the spigot end 18 of the roller carrier, the bolts 17 being threaded into the tool holder. The outer ends of the bores are counterbored at 19 to receive the heads of the bolts 17.

The first described embodiment may utilise a "throw-away" tip type tool and the second embodiment may utilise a standard tool which may be resharpened.

Apart from the main setting up taking place off the machine, an important advantage of the invention is achieved by using a plurality of interchangeable roller carriers which can all be preset ready for use. If one of the rollers in use becomes stuck or the tool chipped all that is necessary is to remove the roller carrier and fit a preset replacement, and production is only held up for as long as is required to do this. The roller carrier can also be replaced by a similar carrier set to a different turning diameter without resetting the mounting part.

What is claimed is:
1. A roller box tool for a turret lathe having a body formed in two parts, namely a mounting part for fixing to the machine turret, and a roller carrier part on which are mounted adjustable rollers and a turning tool holder; the two parts have locating surfaces which interengage to provide accurate relative location and the mounting part comprises a mounting section for attachment to the turret face and a location section which locates relatively to the roller carrier, and is in the form of a plate bolted to the mounting section with a degree of float laterally of the lathe turning axis when the bolts are slackened and with the tool fitted.

2. A roller box tool according to claim 1, wherein the plate has a central cylindrical bore which can be accurately set with respect to the lathe turning axis using a fitting setting piece mounted in a collet or chuck of the machine.

3. A roller box tool according to claim 1, wherein the interengagement of the locating surfaces is provided by a recess in one part and a corresponding spigot on the other part.

4. A roller box tool according to claim 3, wherein the recess is in the location section and the spigot on the roller carrier part.

References Cited
UNITED STATES PATENTS

| | | | |
|---|---|---|---|
| 1,895,191 | 1/1933 | Jones | 82—35 |
| 3,178,973 | 4/1965 | Sweeny | 82—35 |

LEONIDAS VLACHOS, *Primary Examiner.*